US012614288B2

(12) United States Patent
Shen

(10) Patent No.: US 12,614,288 B2
(45) Date of Patent: Apr. 28, 2026

(54) METHOD OF LOCATING AND TRACKING EACH PERSON IN A GUNSHOT EVENT

(71) Applicant: I-Ting Shen, Tainan (TW)

(72) Inventor: I-Ting Shen, Tainan (TW)

( * ) Notice: Subject to any disclaimer, the term of this patent is extended or adjusted under 35 U.S.C. 154(b) by 351 days.

(21) Appl. No.: 18/525,258

(22) Filed: Nov. 30, 2023

(65) Prior Publication Data

US 2025/0157054 A1     May 15, 2025

(30) Foreign Application Priority Data

Nov. 10, 2023     (TW) .................................. 112143519

(51) Int. Cl.
| | |
|---|---|
| *G06K 9/00* | (2022.01) |
| *G01J 5/00* | (2022.01) |
| *G06T 7/246* | (2017.01) |
| *G06T 7/73* | (2017.01) |
| *G06V 20/52* | (2022.01) |

(52) U.S. Cl.
CPC ............ *G06T 7/248* (2017.01); *G01J 5/0066* (2013.01); *G06T 7/74* (2017.01); *G06V 20/52* (2022.01)

(58) Field of Classification Search
CPC .......... G06T 7/248; G06T 7/74; G01J 5/0066; G06V 20/52; G08B 13/1672; G08B 13/19608; G08B 13/19645; H04N 7/181
See application file for complete search history.

(56) References Cited

U.S. PATENT DOCUMENTS

| | | | |
|---|---|---|---|
| 1,643,932 A | 9/1927 | Teich | |
| 1,687,009 A | 10/1928 | Drexler et al. | |

| | | | |
|---|---|---|---|
| 2,820,241 A | 1/1958 | Schlage | |
| 4,102,005 A | 7/1978 | Schnarr et al. | |
| 4,107,877 A | 8/1978 | Lee | |
| 4,267,619 A | 5/1981 | Suska | |
| 4,348,835 A | 9/1982 | Jones et al. | |
| 4,419,787 A | 12/1983 | Lieberman | |
| 4,501,090 A | 2/1985 | Yoshida et al. | |

(Continued)

FOREIGN PATENT DOCUMENTS

| | | |
|---|---|---|
| AU | 2014339759 B2 | 5/2018 |
| DE | 102016202225 A1 | 8/2017 |

(Continued)

*Primary Examiner* — Shervin K Nakhjavan

(74) *Attorney, Agent, or Firm* — Che-Yang Chen; Law Office of Michael Chen

(57)     ABSTRACT

A method of locating and tracking each person in a gunshot event includes creating an electronic map based on an environment. A plurality of image pick-up devices is used to pick up an image of each person in the environment. A plurality of gunshot detection devices is used to detect whether a gunshot event occurs in the environment. When a gunshot event is detected, a gunman characteristics detection procedure is activated. When the gunman characteristics detection procedure detects an image of a person fulfilling gunman characteristics, the person is labeled as a gunman, and the location of the gunman is uploaded and designated on a corresponding location on the electronic map. When no gunshot event is detected, the gunman characteristics detection procedure is not activated. The image is used to track movement and location of the gunman and to continuously update the location of the gunman on the electronic map.

12 Claims, 7 Drawing Sheets

(56) References Cited

U.S. PATENT DOCUMENTS

| | | | |
|---|---|---|---|
| 4,628,636 | A | 12/1986 | Folger |
| 4,867,496 | A | 9/1989 | Thomas |
| 5,040,331 | A | 8/1991 | Merendino et al. |
| 5,782,509 | A | 7/1998 | Uyeda |
| 6,177,771 | B1 | 1/2001 | Kinzer et al. |
| 6,454,324 | B1 | 9/2002 | Lewis et al. |
| 6,553,717 | B2 | 4/2003 | St. John et al. |
| 6,622,535 | B2 | 9/2003 | Chiang et al. |
| 6,634,140 | B1 | 10/2003 | Sellman |
| 6,732,557 | B1 | 5/2004 | Zehrung |
| 6,745,603 | B1 | 6/2004 | Shaw |
| 6,786,006 | B2 | 9/2004 | Kowalczyk et al. |
| 6,891,479 | B1 | 5/2005 | Eccleston |
| 6,978,646 | B2 | 12/2005 | Raatikainen |
| 7,051,403 | B2 | 5/2006 | Homberg |
| 7,061,197 | B1 | 6/2006 | Mullet et al. |
| 7,068,179 | B2 | 6/2006 | Snell et al. |
| 7,143,547 | B2 | 12/2006 | Liles, Jr. |
| 7,234,201 | B2 | 6/2007 | Brown et al. |
| 7,240,524 | B1 | 7/2007 | White et al. |
| 7,282,883 | B2 | 10/2007 | Mullet et al. |
| 7,296,380 | B2 | 11/2007 | Backman |
| 7,316,096 | B2 | 1/2008 | Houser et al. |
| 7,418,800 | B1 | 9/2008 | Sellman |
| 7,484,333 | B2 | 2/2009 | Houser et al. |
| 7,555,867 | B2 | 7/2009 | Liles, Jr. |
| 7,717,155 | B2 | 5/2010 | Mullet |
| 7,774,984 | B2 | 8/2010 | Hsu |
| 7,966,771 | B2 | 6/2011 | Bienek |
| 8,109,038 | B2 | 2/2012 | Houser et al. |
| 8,169,169 | B2 | 5/2012 | Hass et al. |
| 8,201,858 | B1 | 6/2012 | Moon et al. |
| 8,225,458 | B1 | 7/2012 | Hoffberg |
| 8,248,005 | B2 | 8/2012 | Romer |
| 8,359,790 | B2 | 1/2013 | Shin |
| 8,382,008 | B1 | 2/2013 | Ricciardi et al. |
| 8,390,219 | B2 | 3/2013 | Houser |
| 8,393,054 | B2 | 3/2013 | Bienek |
| 8,407,937 | B2 | 4/2013 | Houser |
| 8,415,902 | B2 | 4/2013 | Burris et al. |
| 8,434,268 | B2 | 5/2013 | Nixon |
| 8,499,495 | B2 | 8/2013 | Houser et al. |
| 8,523,248 | B2 | 9/2013 | Tien |
| 8,540,290 | B2 | 9/2013 | Chen |
| 8,547,046 | B2 | 10/2013 | Burris et al. |
| 8,601,744 | B2 | 12/2013 | Wildforster et al. |
| 8,695,277 | B2 | 4/2014 | Romer et al. |
| 8,773,237 | B2 | 7/2014 | Burris et al. |
| 8,826,598 | B2 | 9/2014 | Ranaudo et al. |
| 8,875,344 | B2 | 11/2014 | Salutzki et al. |
| 8,904,710 | B2 | 12/2014 | Romer et al. |
| 8,963,683 | B2 | 2/2015 | Romer |
| 9,003,630 | B2 | 4/2015 | Hufen |
| 9,045,927 | B1 | 6/2015 | Hoffberg |
| 9,097,051 | B2 | 8/2015 | Hellwig |
| 9,115,526 | B2 | 8/2015 | Houser et al. |
| 9,121,217 | B1 | 9/2015 | Hoffberg |
| 9,163,446 | B2 | 10/2015 | Houser et al. |
| 9,181,744 | B2 | 11/2015 | Salutzki et al. |
| 9,187,942 | B2 | 11/2015 | Wildforster |
| 9,297,194 | B2 | 3/2016 | Bienek et al. |
| 9,506,284 | B2 | 11/2016 | Braverman et al. |
| 9,514,583 | B2 | 12/2016 | Zasowski et al. |
| 9,631,412 | B2 | 4/2017 | Hellwig et al. |
| 9,683,378 | B2 | 6/2017 | Houser et al. |
| 9,695,620 | B2 | 7/2017 | Zasowski et al. |
| 9,794,755 | B1 * | 10/2017 | South ............ H04W 4/021 |
| 9,830,932 | B1 | 11/2017 | Gunderson et al. |
| 9,869,117 | B2 | 1/2018 | Houser et al. |
| 9,886,831 | B1 | 2/2018 | Svoboda et al. |
| 9,995,076 | B1 | 6/2018 | Hoffberg |
| 10,006,236 | B2 | 6/2018 | Hellwig et al. |
| 10,024,094 | B2 | 7/2018 | Bell et al. |
| 10,030,425 | B2 | 7/2018 | Zasowski et al. |
| 10,030,426 | B2 | 7/2018 | Langenberg |
| 10,077,591 | B2 | 9/2018 | Hass |
| 10,102,732 | B2 * | 10/2018 | Gersten ............ H04N 7/188 |
| 10,180,023 | B2 | 1/2019 | Zasowski et al. |
| 10,208,520 | B2 | 2/2019 | Long et al. |
| 10,236,801 | B2 | 3/2019 | Dye et al. |
| 10,253,540 | B2 | 4/2019 | Bell et al. |
| 10,273,736 | B2 | 4/2019 | Hucker |
| 10,280,670 | B2 | 5/2019 | Roberts |
| 10,280,678 | B1 | 5/2019 | Rendon, Jr. et al. |
| 10,304,272 | B2 | 5/2019 | Kvinge et al. |
| 10,316,568 | B2 | 6/2019 | Langenberg et al. |
| 10,344,502 | B2 | 7/2019 | McKibben et al. |
| 10,415,301 | B2 | 9/2019 | Kuan |
| 10,458,151 | B1 | 10/2019 | Shen |
| 10,472,873 | B2 | 11/2019 | Ladha et al. |
| 10,480,238 | B1 | 11/2019 | La Force |
| 10,559,151 | B2 | 2/2020 | Kvinge et al. |
| 10,648,198 | B1 | 5/2020 | Shen |
| 10,648,208 | B2 | 5/2020 | Eickhoff |
| 10,704,310 | B1 | 7/2020 | Barbon et al. |
| 10,704,313 | B2 | 7/2020 | Houser et al. |
| 10,724,288 | B2 | 7/2020 | Baumgarte |
| 10,844,644 | B2 | 11/2020 | Langenberg et al. |
| 10,922,982 | B2 * | 2/2021 | Magdaleno ............ B64D 1/18 |
| 10,968,677 | B2 | 4/2021 | Hass |
| 11,002,055 | B2 | 5/2021 | Eickhoff et al. |
| 11,124,997 | B2 | 9/2021 | Eickhoff |
| 11,187,022 | B1 | 11/2021 | Hoffberg |
| 11,250,655 | B2 | 2/2022 | Shen |
| 11,361,639 | B2 * | 6/2022 | Connell, II ............ G08B 25/14 |
| 11,417,200 | B2 | 8/2022 | Hass et al. |
| 11,542,727 | B2 | 1/2023 | Hsu |
| 11,544,979 | B1 | 1/2023 | Shen |
| 11,606,681 | B2 | 3/2023 | Shen |
| 11,629,527 | B2 | 4/2023 | Hsu |
| 11,629,544 | B1 | 4/2023 | Tien |
| 11,631,292 | B2 | 4/2023 | Shen |
| 11,661,782 | B2 | 5/2023 | Eickhoff et al. |
| 11,727,770 | B2 | 8/2023 | Shen et al. |
| 11,753,848 | B2 | 9/2023 | Tien |
| 11,756,355 | B2 | 9/2023 | Shen |
| 11,795,751 | B2 | 10/2023 | Tien |
| 11,798,330 | B2 | 10/2023 | Shen |
| 11,814,876 | B2 | 11/2023 | Huang |
| 11,828,097 | B1 | 11/2023 | Tien |
| 2002/0026750 | A1 | 3/2002 | St. John et al. |
| 2002/0178655 | A1 | 12/2002 | Pedemonte |
| 2003/0127869 | A1 | 7/2003 | Herron et al. |
| 2003/0187805 | A1 | 10/2003 | Shen |
| 2003/0204935 | A1 | 11/2003 | Kim |
| 2005/0154612 | A1 | 7/2005 | Smith et al. |
| 2006/0244271 | A1 | 11/2006 | Hass |
| 2007/0022664 | A1 | 2/2007 | Mahonen et al. |
| 2007/0114800 | A1 | 5/2007 | Kuo |
| 2007/0256362 | A1 | 11/2007 | Hansen |
| 2007/0268132 | A1 | 11/2007 | Milo |
| 2008/0011030 | A1 | 1/2008 | Ferreira Sanchez et al. |
| 2009/0265992 | A1 | 10/2009 | Hass et al. |
| 2010/0107495 | A1 | 5/2010 | Bourgeois et al. |
| 2010/0315229 | A1 | 12/2010 | Shin |
| 2011/0094160 | A1 | 4/2011 | Houser |
| 2011/0252597 | A1 | 10/2011 | Burris et al. |
| 2011/0302841 | A1 | 12/2011 | Ye et al. |
| 2012/0029701 | A1 | 2/2012 | Houser |
| 2012/0159852 | A1 | 6/2012 | Houser et al. |
| 2012/0190325 | A1 | 7/2012 | Abu-Hakima et al. |
| 2013/0009785 | A1 | 1/2013 | Finn et al. |
| 2013/0216438 | A1 | 8/2013 | Hill et al. |
| 2013/0308778 | A1 | 11/2013 | Fosmark et al. |
| 2013/0346333 | A1 | 12/2013 | Hassler et al. |
| 2014/0026627 | A1 | 1/2014 | Rai et al. |
| 2014/0165329 | A1 | 6/2014 | Wildförster |
| 2014/0255252 | A1 | 9/2014 | Stratman et al. |
| 2014/0282934 | A1 | 9/2014 | Miasnik et al. |
| 2014/0325911 | A1 | 11/2014 | Hass |
| 2015/0070166 | A1 | 3/2015 | Boyden et al. |
| 2015/0113876 | A1 | 4/2015 | Burris et al. |
| 2015/0194033 | A1 | 7/2015 | Esposito et al. |
| 2015/0211278 | A1 | 7/2015 | Moyer et al. |

(56)        References Cited

U.S. PATENT DOCUMENTS

| | | | |
|---|---|---|---|
| 2015/0262438 A1 | 9/2015 | Zasowski et al. |
| 2015/0339913 A1 | 11/2015 | Lyman et al. |
| 2016/0220716 A1 | 8/2016 | Childress et al. |
| 2016/0258189 A1 | 9/2016 | Frolov |
| 2016/0312514 A1 | 10/2016 | Leonard et al. |
| 2016/0348415 A1 | 12/2016 | Baumgarte |
| 2016/0368455 A1 | 12/2016 | Kim et al. |
| 2017/0275912 A1 | 9/2017 | Murphy |
| 2017/0275921 A1 | 9/2017 | Murphy et al. |
| 2017/0306668 A1 | 10/2017 | Li et al. |
| 2017/0328100 A1 | 11/2017 | Eickhoff |
| 2018/0223577 A1 | 8/2018 | Hucker |
| 2018/0334841 A1 | 11/2018 | Langenberg et al. |
| 2018/0334845 A1 | 11/2018 | Hass |
| 2019/0043289 A1 | 2/2019 | Cahill |
| 2019/0043296 A1 | 2/2019 | Baumgarte et al. |
| 2019/0145138 A1 | 5/2019 | Eickhoff |
| 2019/0153764 A1 | 5/2019 | Baumgarte |
| 2019/0203503 A1 | 7/2019 | Chang |
| 2019/0264486 A1 | 8/2019 | Toloday et al. |
| 2019/0319557 A1 | 10/2019 | Dye et al. |
| 2019/0338576 A1 | 11/2019 | Wang |
| 2019/0345738 A1 | 11/2019 | McKibben et al. |
| 2019/0357032 A1* | 11/2019 | South .................. H04W 4/90 |
| 2019/0376316 A1 | 12/2019 | Hsu |
| 2019/0376317 A1 | 12/2019 | Hsu |
| 2019/0383080 A1 | 12/2019 | Barbon et al. |
| 2020/0037142 A1* | 1/2020 | Lofton .............. G08B 13/1672 |
| 2020/0190885 A1 | 6/2020 | Coleman |
| 2020/0211362 A1 | 7/2020 | Shen |
| 2020/0225313 A1* | 7/2020 | Coles .................. G06Q 90/205 |
| 2020/0256108 A1 | 8/2020 | Shetty et al. |
| 2020/0327758 A1 | 10/2020 | Ma et al. |
| 2020/0372743 A1 | 11/2020 | Miller et al. |
| 2021/0011443 A1 | 1/2021 | Mcnamara et al. |
| 2021/0012598 A1 | 1/2021 | Giebat et al. |
| 2021/0023248 A1 | 1/2021 | Townsend et al. |
| 2021/0056791 A1 | 2/2021 | Shen |
| 2021/0123287 A1 | 4/2021 | Miller et al. |
| 2021/0134096 A1 | 5/2021 | Pukari |
| 2021/0217260 A1 | 7/2021 | Chen |
| 2021/0252179 A1 | 8/2021 | Grinstead et al. |
| 2021/0308311 A1 | 10/2021 | Stewart et al. |
| 2022/0148393 A1 | 5/2022 | Shen et al. |
| 2022/0307316 A1 | 9/2022 | Soderqvist |
| 2023/0104006 A1 | 4/2023 | Tien |
| 2023/0133080 A1 | 5/2023 | Tien |
| 2024/0062636 A1* | 2/2024 | Barillas .................. H04N 23/23 |

FOREIGN PATENT DOCUMENTS

| | | | |
|---|---|---|---|
| DE | 102017209467 A1 | 12/2018 |
| EP | 0107151 A1 | 5/1984 |
| EP | 1788169 A1 | 5/2007 |
| EP | 2933415 A1 | 10/2015 |
| EP | 3550528 A1 | 9/2019 |
| EP | 3805490 A1 | 4/2021 |
| GB | 2572027 A | 9/2019 |
| KR | 20210019168 A | 2/2021 |
| KR | 20210033154 A | 3/2021 |
| WO | 8800633 A1 | 1/1988 |
| WO | 2021007588 A1 | 1/2021 |
| WO | 2021050616 A1 | 3/2021 |
| WO | 2021214134 A1 | 10/2021 |
| WO | 2022063950 A1 | 3/2022 |
| WO | 2022063952 A1 | 3/2022 |
| WO | 2023036744 A1 | 3/2023 |

* cited by examiner

METHOD OF LOCATING AND TRACKING EACH PERSON IN A GUNSHOT EVENT

BACKGROUND OF THE INVENTION

The present invention relates to a method of locating and track persons and, more particularly, to a method of locating and tracking persons, such as ordinary persons, gunmen, security personnel, etc., in a gunshot event.

Gunshot events occur in schools in the United States from time to time and often cause injury and death of staffs, teachers, and students of the schools. The door access control of a campus is not strict because many persons enter and exit the campus. Furthermore, a campus often occupies a large area and is, thus, difficult to monitor intrusion of criminals. Furthermore, a campus is densely-populated in some areas thereof, such that evacuation of persons is not easy when a gunshot event occurs. Furthermore, a campus has many buildings each having many compartments. As a result, it is not easy to identify the locations of the gunman, the security personnel, and ordinary people in a short time.

BRIEF SUMMARY OF THE INVENTION

In view of the above drawbacks, the present invention provides a method of locating and tracking each person in a gunshot event, with the method comprising:

creating an electronic map based on an environment;

using a plurality of image pick-up devices to pick up an image of each person in the environment;

using a plurality of gunshot detection devices to detect whether a gunshot event occurs in the environment, wherein when a gunshot event is detected, a gunman characteristics detection procedure is activated, wherein when the gunman characteristics detection procedure detects an image of a person fulfilling gunman characteristics, the person is labeled as a gunman, and the location of the gunman is uploaded and designated on a corresponding location on the electronic map, and wherein when no gunshot event is detected, the gunman characteristics detection procedure is not activated; and using the image to track movement and location of the gunman and continuously updating the location of the gunman on the electronic map.

The method according to the present invention can locate the gunman and can continuously track the gunman through the image pick-up devices to display these information on the electronic map, which helps each ordinary person escape or move away from the gunman and also helps the security personnel plan the attack route.

In an example, when the gunman characteristics detection procedure is activated, each of the plurality of gunshot detection devices detects presence of a temperature higher than 45° C. in a detection range thereof. When a place having a temperature higher than 45° C. is detected, a person closest to the place is labeled as the gunman. On the other hand, when no place having a temperature higher than 45° C. is detected, no person in the environment is labeled as the gunman.

In an example, the method further comprises:

providing each security personnel with a hardware identification (ID) label, wherein when one of the plurality of hardware ID label detectors located in an area detects activation of the hardware ID label of each security personnel located in the area, the location of each security personnel with the activated hardware ID label is uploaded, and each security personnel with the activated hardware ID label is designated on a corresponding location on the electronic map and labeled as a security personnel, and wherein when the hardware ID label detector in the area in which the security personnel is located does not detect activation of the respective hardware ID label, every security personnel in the area is not designated as a security personnel on the electronic map, wherein when a respective hardware ID label is detected on the person closest to the location with a temperature higher than 45° C., the person fulfilling the gunman characteristics and having the hardware ID label is not labeled as the gunman, and wherein when a respective hardware ID label is not detected on the person closest to the location with a temperature higher than 45° C., the person fulfilling the gunman characteristics and not having the hardware ID label is labeled as the gunman.

In an example, when the gunman characteristics detection procedure is activated, each gunshot detection device detects presence of a gun-shaped outline. When no gun-shaped outline is detected, no person is designated as a gunman on the electronic map. On the other hand, when the gun-shaped outline is detected, a person closest to the gun-shaped outline is designated as the gunman on the electronic map.

In an example, the method further comprises:

providing each security personnel with a hardware identification (ID) label, wherein when one of the plurality of hardware ID label detectors located in an area detects activation of the hardware ID label of each security personnel located in the area, the location of each security personnel with the activated hardware ID label is uploaded, and each security personnel with the activated hardware ID label is designated on a corresponding location on the electronic map and labeled as a security personnel, and wherein when the hardware ID label detector in an area in which the security personnel is located does not detect activation of the respective hardware ID label, every security personnel in the area is not designated as a security personnel in the electronic map, wherein when a respective hardware ID label is detected on the person closest to the gun-shaped outline, the person fulfilling the gunman characteristics and having the hardware ID label is not labeled as the gunman, and wherein when a respective hardware ID label is not detected on the person closest to the gun-shaped outline, the person fulfilling the gunman characteristics and not having the hardware ID label is labeled as the gunman.

Each security personnel can be located and tracked via the respective hardware ID label and can rapidly log in the system by the respective hardware ID label to obtain the electronic map with the designated gunman location. This assists the security personnel in rapidly handling the information on the electronic map associated with the environment and in obtaining the location of the gunman.

In an example, the method further comprises:

providing each security personnel with a hardware identification (ID) label, wherein when one of the plurality of hardware ID label detectors located in an area detects activation of the hardware ID label of each security personnel located in the area, the location of each security personnel with the activated hardware ID label is uploaded, and each security personnel with the activated hardware ID label is designated on a corresponding location on the electronic map and labeled as a security personnel, and wherein when the hardware ID label detector in an area in which the security personnel is located does not detect activation of the respective hardware ID label, every security personnel in the area is not designated as a security personnel in the electronic map, wherein when a respective hardware ID label is detected on the person fulfilling the gunman characteristics, the person fulfilling the gunman characteristics and having the hardware ID label is not labeled as the gunman, and wherein when a respective hardware ID label is not detected on the person closest to the gunman characteristics, the person fulfilling the gunman characteristics and not having the hardware ID label is labeled as the gunman.

In an example, when each security personnel moves, the movement and the location of the security personnel and the location of the gunman are tracked and updated on the electronic map.

In an example, when one of the security personnel uses the respective hardware ID label to log in and obtain the electronic map, an instant location of the gunman is provided to the one of the security personnel. When one of the security personnel does not use the respective hardware ID label to log in and obtain the electronic map, the instant location of the gunman is not provided to the one of the security personnel.

In an example, the method further comprises: planning an attack route according to the location of the security personnel and the instant location of the gunman, and showing the attack route on the electronic map.

In an example, when an ordinary person uses a smart mobile device to obtain the electronic map, the plurality of image pick-up devices locates and tracks the ordinary person on the electronic map. When an ordinary person does not use the smart mobile device to obtain the electronic map, the location of the ordinary person is not tracked. When the smart mobile device of the ordinary person receives a notification of evacuation, the electronic map is permitted to be opened to obtain the location of the gunman and the location of the security personnel, and an evacuation route is shown on the electronic map. When the smart mobile device of the ordinary person does not receive a notification of evacuation, the smart mobile device of the ordinary person does not send out warning.

Each image pick-up device starts to locate and track an ordinary person only after the ordinary person has logged in the system, providing better privacy.

In an example, the method further comprises: assigning a specific hardware serial number to each of the plurality of image pick-up devices and the plurality of gunshot detection devices, and designating the location of each of the plurality of image pick-up devices and the plurality of gunshot detection devices on the electronic map. When the gunman characteristics detection procedure is activated and no gunman is labeled, a gunshot event area is confirmed according to the specific hardware serial number of one of the plurality of gunshot detection devices which has detected the gunshot, and a gunshot event area is designated on the electronic map.

In a case that no gunman characteristics detection device (such as the image pick-up device including the temperature detection function) detects a person fulfilling the gunman characteristics, the system can still use the hardware serial number of each gunman characteristics detection device to judge the approximate location or area (such as in a room)

where the gunshot event occurs. This still provides assistance in avoiding the gunman and planning the attack route of the security personnel.

The present invention will become clearer in light of the following detailed description of illustrative embodiments of this invention described in connection with the drawings.

Figure 1:
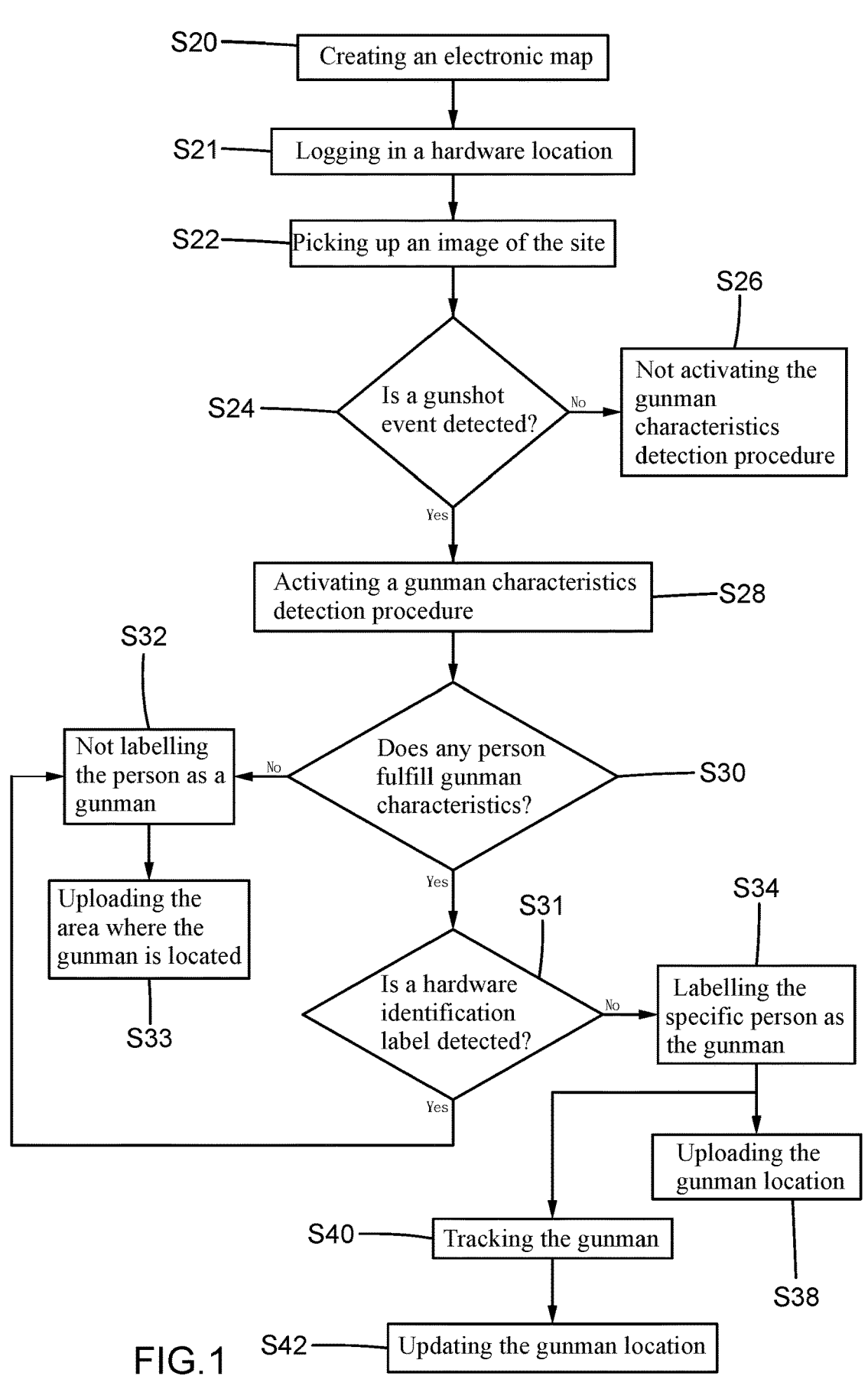
FIG. 1 is a diagrammatic flowchart illustrating a procedure of locating and tracking a person labeled as a gunman in a gunshot event of a method of an embodiment according to the present invention.

All figures are drawn for ease of explanation of the basic teachings of the present invention only; the extensions of the figures with respect to number, position, relationship, and dimensions of the parts to form the embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "inner", "outer", "outside", "indoor", "outdoor", and similar terms are used herein, it should be understood that these terms have reference only to the structure shown in the drawings as it would appear to a person viewing the drawings and are utilized only to facilitate describing the invention. Furthermore, the term "the plurality of" may be simply replaced by "the", and the term "each of the plurality of" may be simply replaced by "each".

DETAILED DESCRIPTION OF THE INVENTION

The present invention relates to a method of locating and tracking each person in a gunshot event. Specifically, the method is capable of locating and tracking gunmen, security personnel, and ordinary persons. The method according to the present invention can be executed via an operating system (OS) cooperating with hardware. The operating system may be but not limited to an application (APP) which can be executed on a plurality of smart mobile devices and an application (APP) which can be executed on a server. With reference to FIGS. 1 and 3-5, firstly, the method according to the present invention includes creating an electronic map 111 of an environment (step S20). The environment may be but not limited to a campus, a company, etc.

In a non-restrictive example in which the environment is a campus, the campus may include an outdoor environment accommodating a plurality of buildings 115. Each building 115 includes a plurality of floors each having a plurality of indoor environments. The floors in each building 115 may have different layouts. Therefore, the electronic map 111 may include be but not limited to an outdoor environment information (e.g., in the form of an electronic map) 113 (see FIG. 4) based on the outdoor environment of the campus and a plurality of indoor environment information (e.g., in the form of an electronic maps) 139 each of which is based on a respective one of the plurality of indoor environments of the campus of a respective floor of a respective building 115 (see FIGS. 6 and 7). Namely, a plurality of indoor electronic maps 139 can be created based on the plurality of indoor environments. The electronic maps 111 (including the indoor electronic map 113 and the outdoor electronic maps 139) may be but not limited to be stored in a database of the server.

Figure 4:
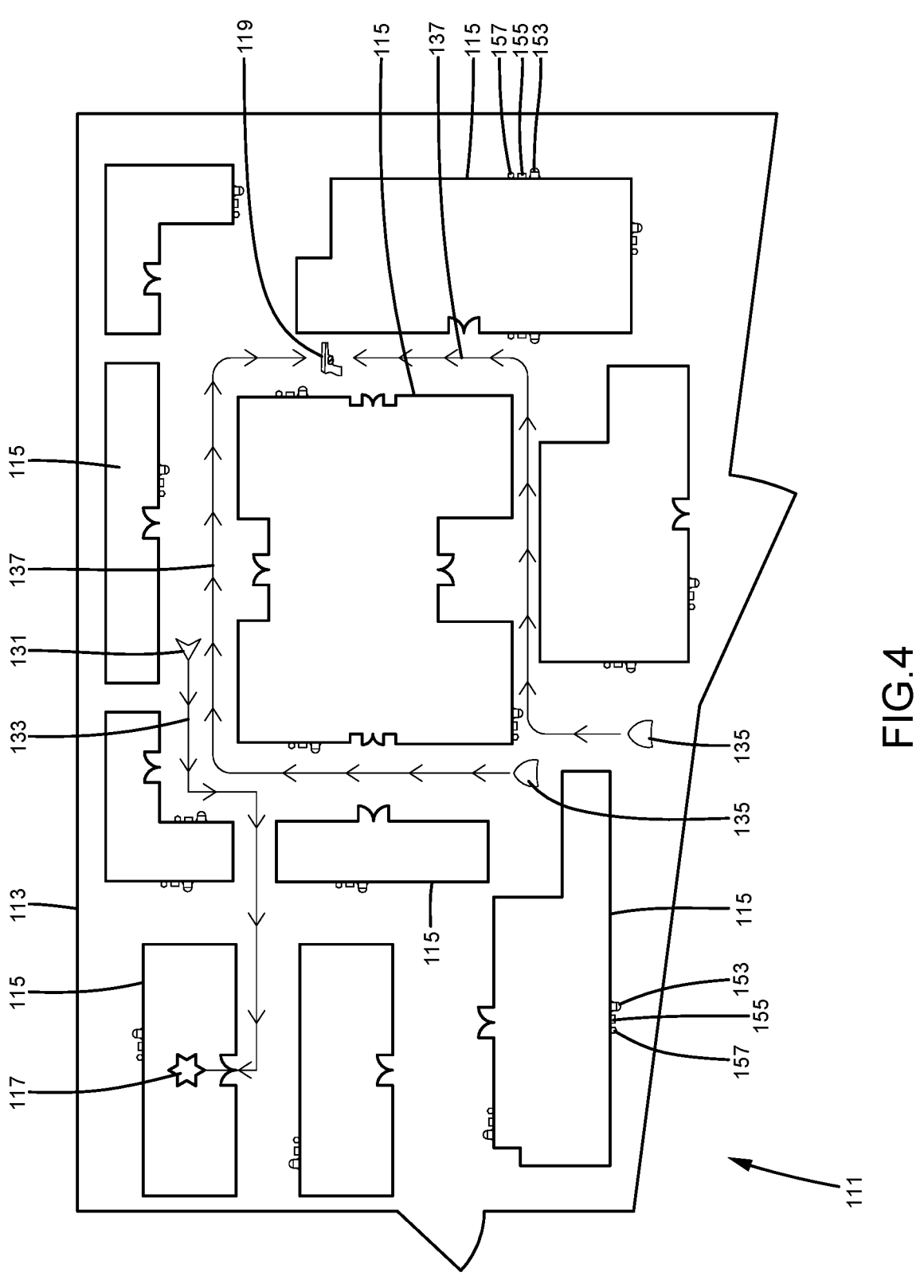
FIG. 4 is a diagrammatic view illustrating an electronic map provided to an ordinary person, with the electronic map being created based on simulation of an outdoor environment in which a gunshot event occurs.
Figure 5:
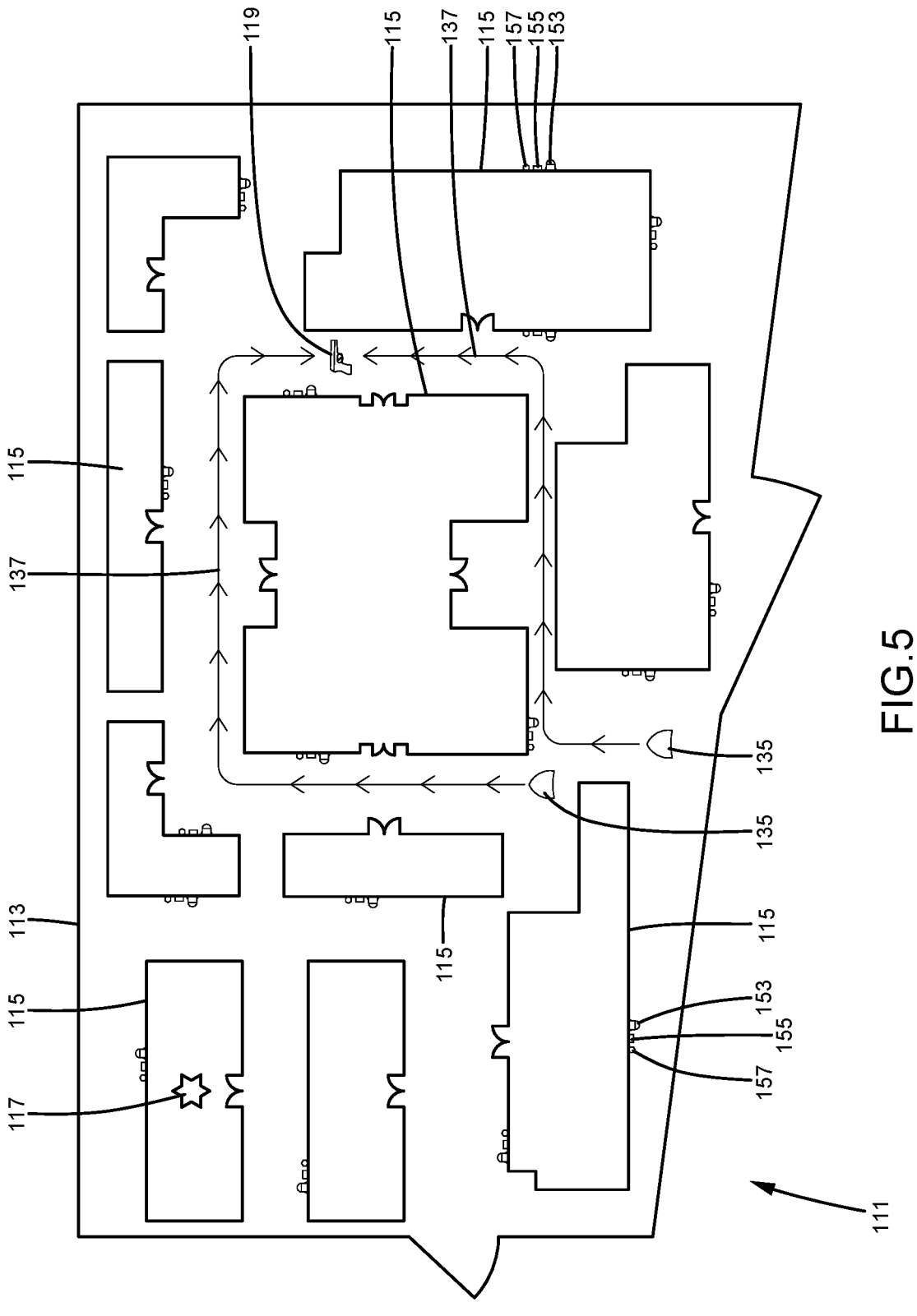
FIG. 5 is a diagrammatic view illustrating an electronic map provided to a security personnel, with the electronic map being created based on simulation of an outdoor environment in which a gunshot event occurs.
Figure 6:
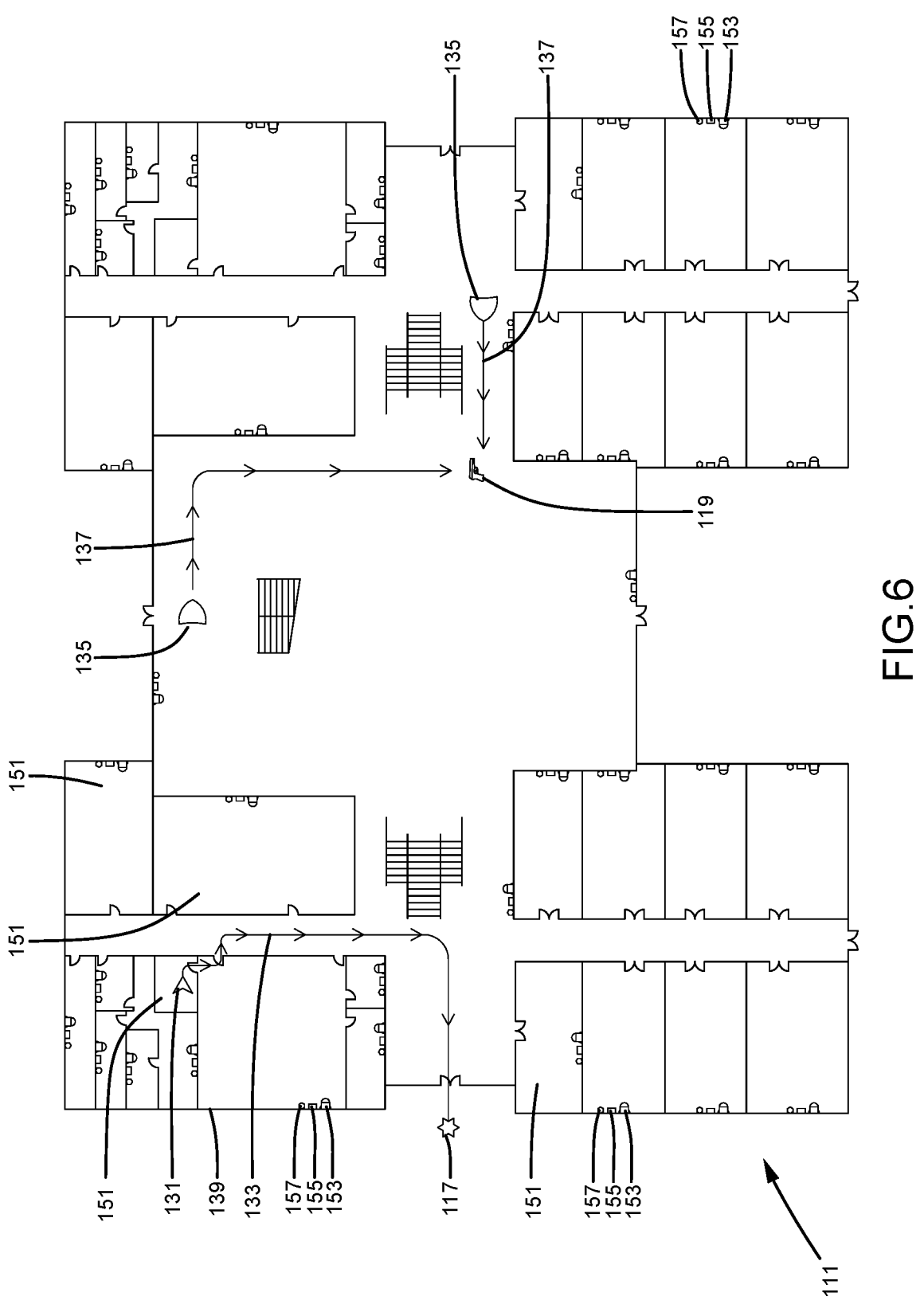
FIG. 6 is a diagrammatic view illustrating an electronic map provided to an ordinary person, with the electronic map being created based on simulation of an indoor environment in which a gunshot event occurs.
Figure 7:
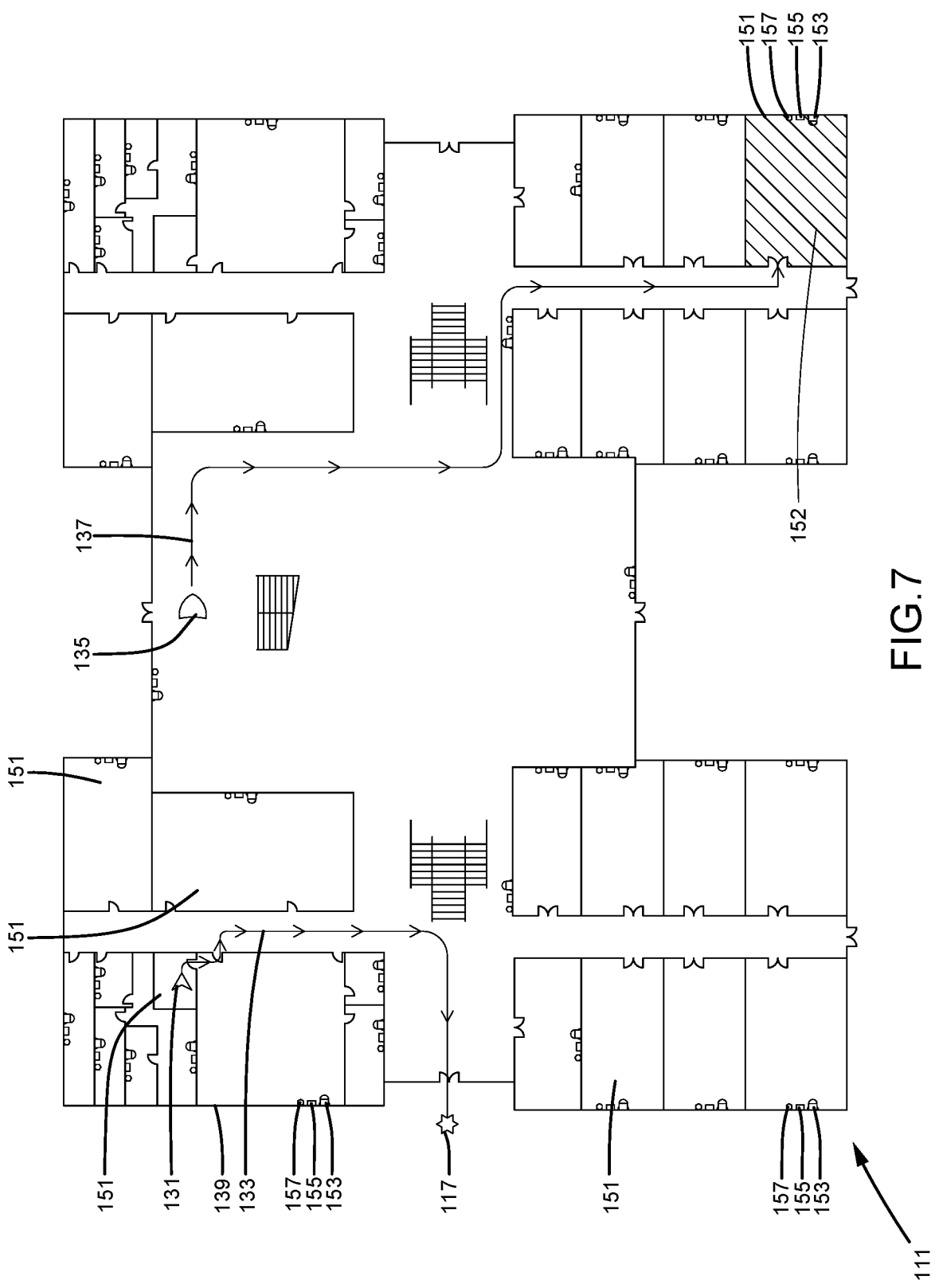
FIG. 7 is a diagrammatic view illustrating an electronic map provided to an ordinary person in a situation in which the gunman cannot be accurately located.

With reference to FIGS. 4 and 5, the outdoor electronic map 113 of the electronic map 111 includes distribution of the buildings 115. FIGS. 6 and 7 show one of the indoor electronic maps 139 of the electronic map 111, and the indoor electronic map 139 shows distribution of a plurality of rooms 151.

A plurality of image pick-up devices 153, a plurality of gunshot detection devices 155, a plurality of gunman characteristics detection devices (which is not specifically illustrated, as the image pick-up devices of the embodiment according to the present invention also includes the functionality of detecting the characteristics of a gunman), and a plurality of hardware identification (ID) label detectors 157 (as shown in FIGS. 4-7) may be installed in each of the outdoor environment and the indoor environments of each floor according to the layout per se. In a non-restrictive example, each pick-up device may include a system capable of locating and tracking a specific person and may be manufactured by OUTSTER Inc. of the United States. Each pick-up device may cooperate with the operating system and the electronic map 111 to track the location and movement of each person.

Each of the image pick-up devices 153, the gunshot detection devices 155, the gunman characteristics detection devices, and the hardware ID label detectors 157 is assigned with a specific hardware serial number and is registered and illustrated on a location on the electronic map 111 corresponding to the actual location of the respective device. Namely, in step S21, each of the above devices is illustrated on a respective location on the electronic map 111 according to the actual location thereof.

Each hardware ID label detector 157 is used to detect the locations of the hardware ID labels. Each of the hardware ID label detectors 157 and the hardware ID labels may be but not limited to a device using Bluetooth or ultra-wideband (UWB) technology. In the method according to the present invention, each hardware ID label is provided to a respective one of security personnel entering the environment to accurately distinguish a gunman holding a gun and a security personnel holding a gun. The security personnel may be but not limited to policemen, security guards, or staff working in the environment.

Each image pick-up device 153 is used to pick up image of the persons moving in the environment. Specifically, each of the image pick-up devices 153 in the outdoor environment and each floor of each building can pick up the image of the environment on the site. In a non-restrictive example, each image pick-up device 153 neither locates nor tracks movement and location of persons when no gunshot event occurs.

The gunshot detection devices 155 are used to detect whether a gunshot event occurs in the environment (step S24). When any gunshot detection device 155 detects occurrence of a gunshot event, a gunman characteristics detection procedure is activated to identify the gunman (step S28). On the other hand, when no gunshot event is detected, the gunman characteristics detection procedure is not activated (step S26).

Specifically, occurrence of a gunshot event in the environment is identified by each gunshot detection device 155. In a non-restrictive example, each gunshot detection device 155 may be an acoustic gunshot detection device which detects a gunshot in the environment by sound wave identification. Therefore, when no gunshot sound waves are detected by the gunshot detection devices 155 in the environment, each gunman characteristics detection device will not be activated to detect the characteristics of a gunman. On the other hand, when any gunshot detection device 155 detects occurrence of a gunshot event (such as by detection of the gunshot sound waves), each gunman characteristics detection device starts to search whether any person in the respective detection range fulfills the gunman characteristics. In this embodiment, each image pick-up device 153 is used to detect presence of the person fulfilling the gunman characteristics.

In a case that an outline of a gun (such as a long gun, a short gun, a handgun, etc.) is detected by at least one gunman characteristics detection device, a person closest to the outline of the gun is the gunman. Furthermore, in an example that each gunman characteristics detection device includes functionalities of detecting temperature or identifying the outline of guns, the gunman characteristics detection devices may be replaced by the image pick-up devices 153. Namely, the gunman characteristics detection devices and the image pick-up devices 153 are the same devices. In the embodiment shown in FIGS. 4-7, each image pick-up device 153 also includes a temperature detecting function and, thus, may serve as a gunman characteristics detection device. Therefore, no gunman characteristics detection devices are illustrated in FIGS. 4-7.

In an example that each gunman characteristics detection device detects the temperature, considering the body temperature of a person having a fever should be below 42° C., and the surface temperature of the barrel of a gun is about 50° C. after shooting a bullet, a person nearest to a temperature source (detected by a gunman characteristics detection device) is higher than 45° C. can be identified as a gunman.

For example, each gunman characteristics detection device includes the function of an infrared thermal camera, when a gunshot detection device 155 detects occurrence of a gunshot event, each image pick-up device 153 detects whether a temperature source higher than 45° C. exists in the respective detection range. When no temperature source higher than 45° C. is detected by the gunshot detection devices 155, each image pick-up device 153 will not label people in the respective detection range as a gunman.

It is worth mentioning that when the detected person fulfilling the characteristics of a gunman also possesses a hardware ID label after detection, the detected person possessing the hardware ID label will not be labeled as a gunman (see steps S31 and S32). Specifically, when a gunshot event occurs in an environment, not all persons fulfilling the gunman characteristics are gunmen. For example, each security personnel (such as a policeman) may carry a gun, and each security personnel will be detected as fulfilling the gunman characteristics when engaging fire with the gunman. In this case, each security personnel fulfilling the gunman characteristics will not be labeled as a gunman when no hardware ID label is detected by adjacent hardware ID label detector 157. Thus, each security personnel fulfilling the gunman characteristics will not be labeled as a gunman in the image data picked up by the respective image pick-up device 153.

It can be appreciated that when a person fulfills the gunman characteristics in the gunman characteristics detection procedure and no hardware ID label is detected, the person is labeled as a gunman (see steps S30 and S34). Then, the location of the person labeled as a gunman is uploaded and designated on the electronic map 111. Next, the image picked-up by each image pick-up device 153 is used to track movement and location of the labeled gunman and is continuously updated and designated on the electronic map 111 (see steps S40 and S42).

With reference to FIGS. 4 and 5, the location of each gunman 119 can be but not limited to a gun icon on the electronic map 111, and the number of the gun icons are the same as the number of the gunmen. The gun icons can be used to show the location and movement of the gunmen 119.

As mentioned above in step S21, each of the image pick-up devices 153, the gunshot detection devices 155, the gunman characteristics detection device, and the hardware ID label detectors 157 is assigned with a specific hardware serial number and is designated on the electronic map 111 according to the respective actual location. In a case that the gunman characteristics detection procedure is activated and no person is labeled as a gunman, the gunshot area is confirmed by the hardware serial number of the gunshot detection device 155 which has detected the gunshot event, and the gunshot area is designated on the electronic map 111 (step S33).

With reference to FIGS. 1 and 7, when at least one of the gunshot detection devices 155 detects occurrence of a gunshot event, although the gunman characteristics detection procedure may be activated to detect whether any person fulfills the gunman characteristics, there may be a situation that the gunshot event is detected but the person fulfilling the gunman characteristics is not detected, such that no person is labeled as the gunman. In this situation, the gunshot area is confirmed by the hardware serial number of the gunshot detection device 155 which has detected the gunshot event, and the gunshot area is designated on the electronic map 111 (step S33).

Specifically, in this situation, although the exact location of the gunman 119 cannot be tracked and located, since each the gunshot detection device 155 has a specific hardware serial number, the location of the gunshot event can still be confirmed by the hardware serial number of the gunshot detection device 155 which has detected the gunshot event. Therefore, although the exact location of the gunman 119 cannot be designated on the electronic map 111 due to no person fulfills the gunman characteristics, the gunshot event location can still be designated on the electronic map 111. For example, as shown in FIG. 7, the room 151 at the lower right corner is defined as a gunshot event area 152 (the hatched area) on the electronic map 111.

Figure 2:
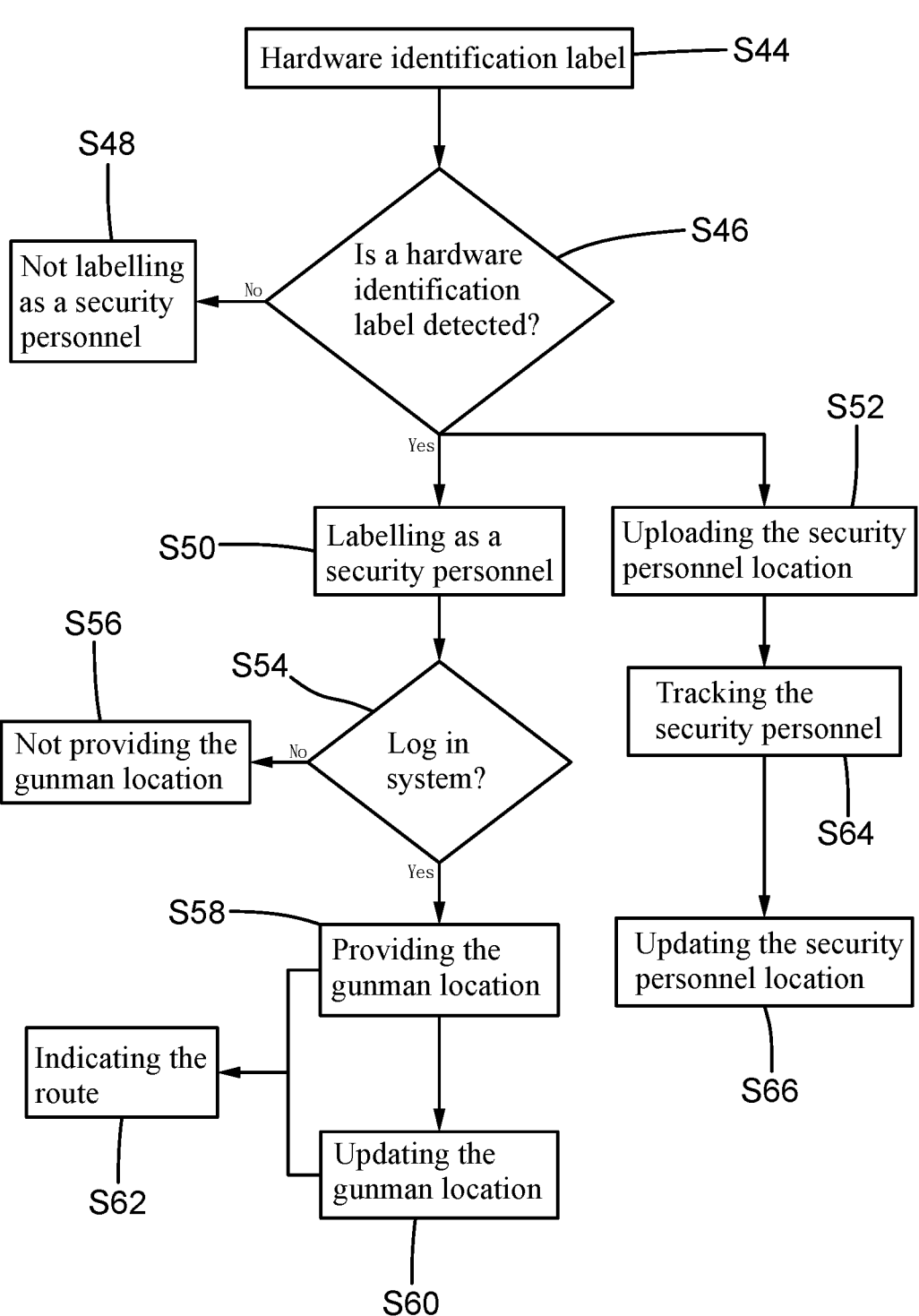
FIG. 2 is a diagrammatic flowchart illustrating a procedure of locating and tracking a person labeled as a security personnel and obtaining the gunman location in a gunshot event of the method of the embodiment according to the present invention.

With reference to FIG. 2, in a non-restrictive example, when a gunshot occurs in the environment, at least one security personnel (such as policemen or servicemen) may be allowed to enter the environment after reporting to the police (such as automatic report by a system after the gunshot event is detected). Each security personnel may obtain a hardware ID label from a staff (such as a guard in the security office of the school). When no hardware ID label of the security personnel is detected by the hardware ID label detectors 157, the security personnel will not be designated on the electronic map 111 (step S48). With reference to FIGS. 4-6, when the hardware ID label given to the security personnel is detected by at least one of the hardware ID label detectors 157, the location of the detected hardware ID label is uploaded and designated on the electronic map 111 by an icon representing a respective security personnel 135. It can be appreciated that both the location of the gunman 119 and the location of the security personnel 135 are designated on the electronic map 111, and an attack route 137 (which has not been sent to the security personnel 135 yet) can be planned based on the location of the gunman 119 and the location of the security personnel 135.

In a non-restrictive example, each security personnel 135 may use a smart mobile device to connect with a hardware ID label log-in system. Specifically, in an example of the method according to the present invention, an application (APP) installed on a smart mobile device can be executed to sense the hardware ID label and log in the operating system. When no security personnel logs in the operating system through detection of the hardware ID label, the electronic map 111 will not be provided to the smart mobile device of each security personnel 135 (step S56). In this state, the smart mobile device of each security personnel 135 cannot obtain the location of the gunman 119. On the other hand, when each security personnel 135 logs in the operating system after detection of the respective hardware ID label, the operating system will designate the gunman location and the gunman movement route, and will plan an attack route based on the gunman location and the gunman movement route (steps S58, S60, and S62). Then, each security personnel 135 can find the gunman 119 based on the actual location of the gunman 119 and the suggested attack route 137, and/or can draw up an attack plan.

Figure 3:
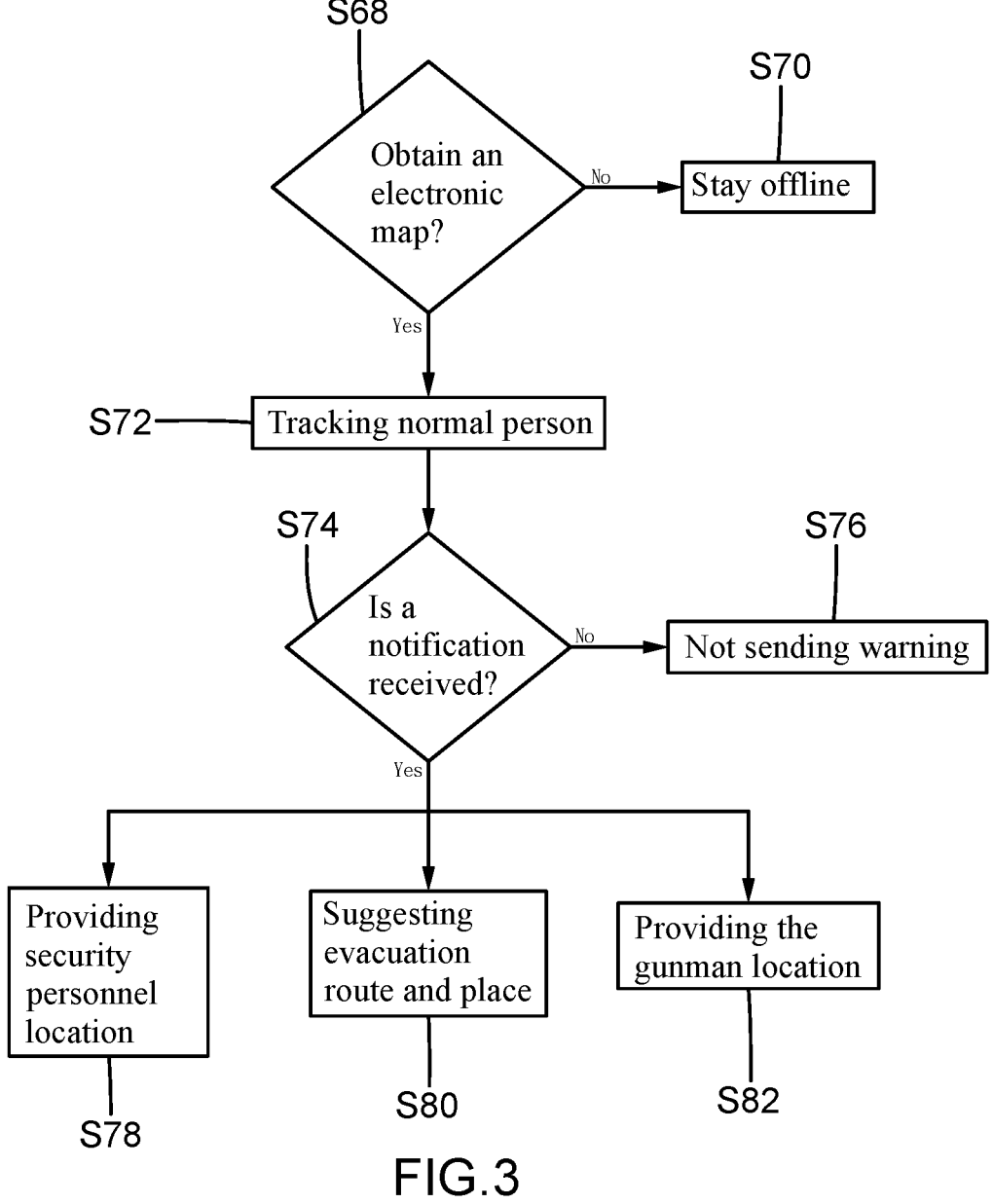
FIG. 3 is a diagrammatic flowchart illustrating a procedure of providing an ordinary person with information of the gunman location and a suggested evacuation route in a gunshot event of the method of the embodiment according to the present invention.

With reference to FIG. 3, assuming that there are some ordinary persons 131 (such as the students and staff in a school) in the environment, when a gunshot event occurs in the environment, each ordinary person 131 can log in the system and be located. Each ordinary person 131 can know the location of the gunman 119 from the electronic map 111. Then, the system guides each ordinary person 131 to evacuate and to evade the gunman 119 based on the location of the gunman 119. On the other hand, when no gunshot event occurs in the environment, each ordinary person 131 does not log in the operating system and, thus, will not be located and tracked. Specifically, when each ordinary person 131 does not use a smart mobile device to obtain the electronic map 111, the location of the ordinary person 131 is not tracked (steps S68 and S70). In this case, the smart mole device held by each ordinary person 131 stays offline with respect to the operating system executing the method according to the present invention. Each ordinary person 131 cannot obtain the electronic map 111, and each the image pick-up device 153 will not locate and track each ordinary person 131.

When an ordinary person 131 uses his or her smart mobile device to obtain the electronic map 111, the image pick-up devices 153 locate and track the ordinary person 131 which has obtained the electronic map 111 (step S72). Namely, in a non-restrictive example, no matter whether a gunshot event occurs or not, each ordinary person 131 may use the respective smart mobile device to input an account and a password through execution of an application (APP) to thereby log in the system, such that each ordinary person 131 can obtain the electronic map 111. In this state, the smart mobile device (which has logged in via the APP) can be used to locate and track the respective ordinary person 131. For example, when an ordinary person 131 executes the APP on his or her smart mobile device to log in the system executing the method according to the present invention, each hardware ID label detector 157 can locate the ordinary person 131 via the Bluetooth signal strength and can cooperate with nearby image pick-up devices 153 to define the location of the ordinary person 131 to be tracked.

When the smart mobile device of an ordinary person 131 does not receive an evacuation notice, the smart mobile device of the ordinary person 131 does not send out a reminding message (steps S74 and S76). Namely, in a case that no gunshot event occurs, even if an ordinary person 131 uses the smart mobile device to log in the operating system, the APP can show the electronic map 111 but cannot show information of the gunman location, the evacuation route, and the emergency refuge area, and the security personnel location on the electronic map 111. Furthermore, the APP runs in background (the application still runs, but the respective interface is not shown on a screen of the smart mobile device), such that no notification will pop up under operation of the APP.

Thus, when each ordinary person 131 uses the respective smart mobile device to log in the system and a gunshot event occurs, even if the APP runs in background, the system will automatically send a notification to the smart mobile device of each ordinary person 131. Namely, the APP executed on each smart mobile device runs in background will inform the respective ordinary person 131 of the gunshot event by showing the notification on the interface displayed on the screen. Then, after the smart mobile device of the respective ordinary person 131 receives the evacuation notification, the electronic map 111 can be opened to obtain the gunman location, the security personnel location, and an evacuation route on the electronic map 111 (see steps S78, S80, and S82).

Now that the basic features of the method of the present invention has been explained, the execution and some of the advantages of the method according to the present invention can be set forth and appreciated. In particular, for the sake of explanation, it will be assumed that a system executing the method according to the present invention is installed in a campus, and the campus includes an outdoor environment and a plurality of indoor environments in each floor of a plurality of buildings in the campus. Therefore, the electronic map 111 comprises an outdoor environment information (outdoor electronic map) 113 based on the outdoor environment and a plurality of indoor environment information (indoor environment maps) 139 based on the plurality of indoor environments. A plurality of image pick-up devices 153, a plurality of gunshot detection devices 155, and a plurality of hardware ID label detectors 157 are disposed on the outer side of each building and inside each indoor environment according to the actual environmental layout. Each image pick-up device 153 includes a temperature detection function and, thus, can also serve as a gunman characteristics detection device. Each of the teachers, students, and staffs (ordinary persons) of the school can use his or her own smart mobile device to input the respective account and password to thereby log in the system.

With reference to FIG. 4, assuming a person carrying a gun enters the campus and fires one or more bullets in a place of the outdoor environment, at least one nearby gunshot detection device 155 detects the gunshot event, and the system executes the gunman characteristics detection procedure. One of the image pick-up devices 153 (including the gunman characteristics detection function) detects the temperature at a place is higher than 45° C. and picks up the image of the person closest to the relatively-high-temperature place. Then, the system uses the hardware serial number of the image pick-up device 153 at the location of the gunman and analysis of the picked-up image to designate the location of the gunman 119 on a corresponding location of the outdoor electronic map 113 of the electronic map 111.

While detecting the gunshot event, the system automatically sends out a notice to each of the smart mobile devices of the ordinary persons 131. In this state, the notice (notifying occurrence of the gunshot event) pops out of the smart mobile device of each ordinary person 131 which has logged in the operating system. Each ordinary person 131 can uses his or her own smart mobile device to obtain the electronic map 111 with the labeled gunman location 119 via the APP. The electronic map 111 further shows an emergency refuge area 117 and an evacuation route 133 which are planned based on the locations of the ordinary persons 131 and the location of the gunman 119.

It is worth mentioning that since the locations of the ordinary persons 131 (which have logged in the operating system) may be different, such that the emergency refuge area 117 and the evacuation route 133 planned by the APP of the smart mobile device of an ordinary person 131 may be different from those planned by the APP of the smart mobile device of another ordinary person 131. Nevertheless, the smart mobile device of an ordinary person 131 can only show his or her own emergency refuge area 117 and evacuation route 133.

With reference to FIG. 5, after occurrence of the gunshot event, in a case that the police (the security personnel 135) has reached the site, each policeman can receive a hardware ID label from a security guard of the school. After wearing and activating the hardware ID label, at least one the hardware ID label detector 157 near the policeman can locate the policeman, and the location of the policeman can be designated on the electronic map 111 after uploading to the system. Thus, the location and movement of each policeman (security personnel 135) can be shown on the electronic map 111.

Furthermore, after each policeman installs and executes the APP on his or her smart mobile device, each policeman can obtain the electronic map 111 after detection of the respective hardware ID label without application to register and log in the system. Thus, each policeman can know his or her own location, the location of the gunman 119, and the location of the emergency refuge area 117 on the electronic map 111, but cannot know the location and the respective evacuation route 133 of each ordinary person 131. Furthermore, a suggested attack route 137 is shown on the electronic map 111. It is noted that the electronic map 111 obtained by a policeman may include but not limited to the location and attack route 137 of every one of the other policemen which have been located and tracked (see FIG. 5).

With reference to FIG. 4, furthermore, in a non-respective example, after each security personnel 135 has been located and tracked, the electronic map 111 obtained by each ordinary person 131 (which has logged in) can update and show the location and the attack route 137 of each security personnel 135.

With reference to FIG. 6, in a case that the gunman 119 moves from the outdoor environment into one of the indoor environments (hereinafter referred to as "the indoor environment" to simplify the description), since the image pick-up devices 153 will keep on tracking the location of the gunman 119, when the gunman 119 moves into the environment, an indoor environment information (in the form of an electronic map) 139 is shown on the smart mobile device of each ordinary person 131 and the smart mobile device of each security personnel 135. Furthermore, each of the ordinary persons 131 and the security personnel 135 is provided with the information of a respective emergency refuge area 117, the location of the gunman 119, the location of the respective security personnel 135, a respective evacuation route 133, and/or a respective attack route 137.

It can be appreciated that when the first gunshot event occurs in an indoor space, locating and tracking of the gunman 119, locating and tracking of each ordinary person 131, and locating and tracking of each security personnel 135 are the same as those in the case of the first gunshot event occurred in the outdoor space. Therefore, redundant description is not set forth.

FIG. 7 simulates a situation in which an electronic map 111 provided to an ordinary person in a case where the gunman cannot be accurately located. Specifically, after the gunshot event, each the image pick-up device 153 (including a gunman the gunman characteristics detection device) may not be able to detect the person fulfilling the gunman characteristics, such that no person whose image has been picked up can be labeled as the gunman. As a result, tracking and locating of the gunman cannot be achieved. In this case, since each the gunshot detection device 155 has a specific hardware serial number, the approximate location of the gunshot event can be judged from the hardware serial number of the gunshot detection device 155 which detects the gunshot. As shown in FIG. 7, assuming a gunshot event occurs in a room 151 at the lower right corner and is detected by the gunshot detection device 155 in the room 151, but the gunman characteristics detection device in the room 151 does not detect any person fulfilling the gunman characteristics. In this case, the room 151 at the lower right corner will be designated as a gunshot event area 152 on the electronic map 111. Furthermore, each ordinary person 131 or each security personnel 135 still can judge the approximate location of the gunshot event according to the gunshot event area 152, such that the evacuation route 133 and the attack route 137 can still be planned by the system carrying out the method according to the present invention.

The method according to the present invention can locate the gunman 119 and can continuously track the gunman 119 through the image pick-up devices 153 to display these information on the electronic map 111, which helps each ordinary person 131 escape or move away from the gunman 119 and also helps the security personnel 135 plan the attack route 137.

Each security personnel 135 can be located and tracked via the respective hardware ID label and can rapidly log in the system by the respective hardware ID label to obtain the electronic map 111 with the designated gunman location. This assists the security personnel 135 in rapidly handling the information on the electronic map 111 associated with the environment and in obtaining the location of the gunman 119.

Each image pick-up device 153 starts to locate and track an ordinary person 131 only after the ordinary person 131 has logged in the system, providing better privacy.

In a case that no gunman characteristics detection device (such as the image pick-up device 153 including the temperature detection function) detects a person fulfilling the gunman characteristics, the system can still use the hardware serial number of each gunman characteristics detection device to judge the approximate location or area (such as in a room) where the gunshot event occurs. This still provides assistance in avoiding the gunman 119 and planning the attack route 137 of the security personnel 135.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A method of locating and tracking each person in a gunshot event, with the method comprising:
   creating an electronic map based on an environment;
   using a plurality of image pick-up devices to pick up an image of each person in the environment;
   using a plurality of gunshot detection devices to detect whether a gunshot event occurs in the environment, wherein when a gunshot event is detected, a gunman characteristics detection procedure is activated, wherein when the gunman characteristics detection procedure detects an image of a person fulfilling gunman characteristics, the person is labeled as a gunman, and the location of the gunman is uploaded and designated on a corresponding location on the electronic map, and wherein when no gunshot event is detected, the gunman characteristics detection procedure is not activated; and
   using the image to track movement and location of the gunman and continuously updating the location of the gunman on the electronic map,
   wherein when the gunman characteristics detection procedure is activated, each of the plurality of gunshot detection devices detects presence of a temperature higher than 45° C. in a detection range thereof, wherein when a place having a temperature higher than 45° C. is detected, a person closest to the place is labeled as the gunman, and wherein no place having a temperature higher than 45° C. is detected, no person in the environment is labeled as the gunman.

2. The method as claimed in claim 1, further comprising:
   providing each security personnel with a hardware identification (ID) label, wherein when one of the plurality of hardware ID label detectors located in an area detects activation of the hardware ID label of each security personnel located in the area, the location of each security personnel with the activated hardware ID label is uploaded, and each security personnel with the activated hardware ID label is designated on a corresponding location on the electronic map and labeled as a security personnel, and wherein when the hardware ID label detector in the area in which the security personnel is located does not detect activation of the respective hardware ID label, every security personnel in the area is not designated as a security personnel on the electronic map, wherein when a respective hardware ID label is detected on the person closest to the location with a temperature higher than 45° C., the person fulfilling the gunman characteristics and having the hardware ID label is not labeled as the gunman, and wherein when a respective hardware ID label is not detected on the person closest to the location with a temperature higher than 45° C., the person fulfilling the gunman characteristics and not having the hardware ID label is labeled as the gunman.

3. The method as claimed in claim 1, further comprising providing each security personnel with a hardware identification (ID) label, wherein when one of the plurality of hardware ID label detectors located in an area detects activation of the hardware ID label of each security personnel located in the area, the location of each security personnel with the activated hardware ID label is uploaded, and each security personnel with the activated hardware ID label is designated on a corresponding location on the electronic map and labeled as a security personnel, and wherein when the hardware ID label detector in an area in which the security personnel is located does not detect activation of the respective hardware ID label, every security personnel in the area is not designated as a security personnel in the electronic map, wherein when a respective hardware ID label is detected on the person fulfilling the gunman characteristics, the person fulfilling the gunman characteristics and having the hardware ID label is not labeled as the gunman, and wherein when a respective hardware ID label is not detected on the person closest to the gunman characteristics, the person fulfilling the gunman characteristics and not having the hardware ID label is labeled as the gunman.

4. The method as claimed in claim 3, wherein when each security personnel moves, the movement and the location of the security personnel and the location of the gunman are tracked and updated on the electronic map.

5. The method as claimed in claim 3, wherein when one of the security personnel uses the respective hardware ID label to log in and obtain the electronic map, an instant location of the gunman is provided to the one of the security personnel, and wherein when one of the security personnel does not use the respective hardware ID label to log in and obtain the electronic map, the instant location of the gunman is not provided to the one of the security personnel.

6. The method as claimed in claim 5, further comprising: planning an attack route according to the location of the security personnel and the instant location of the gunman, and showing the attack route on the electronic map.

7. The method as claimed in claim 3, wherein when an ordinary person uses a smart mobile device to obtain the electronic map, the plurality of image pick-up devices locates and tracks the ordinary person on the electronic map, wherein when an ordinary person does not use the smart mobile device to obtain the electronic map, the location of the ordinary person is not tracked, wherein when the smart mobile device of the ordinary person receives a notification of evacuation, the electronic map is permitted to be opened to obtain the location of the gunman and the location of the security personnel, and an evacuation route is shown on the electronic map, wherein when the smart mobile device of the ordinary person does not receive a notification of evacuation, the smart mobile device of the ordinary person does not send out warning.

8. The method as claimed in claim 1, further comprising: assigning a specific hardware serial number to each of the plurality of image pick-up devices and the plurality of gunshot detection devices, and designating the location of each of the plurality of image pick-up devices and the plurality of gunshot detection devices on the electronic map, wherein when the gunman characteristics detection procedure is activated and no gunman is labeled, a gunshot event area is confirmed according to the specific hardware serial number of one of the plurality of gunshot detection devices which has detected the gunshot, and a gunshot event area is designated on the electronic map.

9. A method of locating and tracking each person in a gunshot event, with the method comprising:

creating an electronic map based on an environment;

using a plurality of image pick-up devices to pick up an image of each person in the environment;

using a plurality of gunshot detection devices to detect whether a gunshot event occurs in the environment, wherein when a gunshot event is detected, a gunman characteristics detection procedure is activated, wherein when the gunman characteristics detection procedure detects an image of a person fulfilling gunman characteristics, the person is labeled as a gunman, and the location of the gunman is uploaded and designated on a corresponding location on the electronic map, and wherein when no gunshot event is detected, the gunman characteristics detection procedure is not activated; and using the image to track movement and location of the gunman and continuously updating the location of the gunman on the electronic map, wherein when the gunman characteristics detection procedure is activated, each gunshot detection device detects presence of a gun-shaped outline, wherein when no gun-shaped outline is detected, no person is designated as a gunman on the electronic map, and wherein when the gun-shaped outline is detected, a person closest to the gun-shaped outline is designated as the gunman on the electronic map.

10. The method as claimed in claim 9, further comprising: providing each security personnel with a hardware identification (ID) label, wherein when one of the plurality of hardware ID label detectors located in an area detects activation of the hardware ID label of each security personnel located in the area, the location of each security personnel with the activated hardware ID label is uploaded, and each security personnel with the activated hardware ID label is designated on a corresponding location on the electronic map and labeled as a security personnel, and wherein when the hardware ID label detector in an area in which the security personnel is located does not detect activation of the respective hardware ID label, every security personnel in the area is not designated as a security personnel in the electronic map, wherein when a respective hardware ID label is detected on the person closest to the gun-shaped outline, the person fulfilling the gunman characteristics and having the hardware ID label is not labeled as the gunman, and wherein when a respective hardware ID label is not detected on the person closest to the gun-shaped outline, the person fulfilling the gunman characteristics and not having the hardware ID label is labeled as the gunman.

11. The method as claimed in claim 9, further comprising:

providing each security personnel with a hardware identification (ID) label, wherein when one of the plurality of hardware ID label detectors located in an area detects activation of the hardware ID label of each security personnel located in the area, the location of each security personnel with the activated hardware ID label is uploaded, and each security personnel with the activated hardware ID label is designated on a corresponding location on the electronic map and labeled as a security personnel, and wherein when the hardware ID label detector in an area in which the security personnel is located does not detect activation of the respective hardware ID label, every security personnel in the area is not designated as a security personnel in the electronic map, wherein when a respective hardware ID label is detected on the person fulfilling the gunman characteristics, the person fulfilling the gunman characteristics and having the hardware ID label is not labeled as the gunman, and wherein when a respective hardware ID label is not detected on the person closest to the gunman characteristics, the person fulfilling the gunman characteristics and not having the hardware ID label is labeled as the gunman.

12. The method as claimed in claim 9, further comprising:

assigning a specific hardware serial number to each of the plurality of image pick-up devices and the plurality of gunshot detection devices, and designating the location of each of the plurality of image pick-up devices and the plurality of gunshot detection devices on the electronic map, wherein when the gunman characteristics detection procedure is activated and no gunman is labeled, a gunshot event area is confirmed according to the specific hardware serial number of one of the plurality of gunshot detection devices which has detected the gunshot, and a gunshot event area is designated on the electronic map.

\* \* \* \* \*